(12) United States Patent
Xie et al.

(10) Patent No.: US 10,375,640 B2
(45) Date of Patent: Aug. 6, 2019

(54) METHOD FOR SWITCHING BLUETOOTH WORKING MODES, ELECTRONIC DEVICE, AND BLUETOOTH CHIP

(71) Applicant: SMARTECH WORLDWIDE LIMITED, Tortola (VG)

(72) Inventors: Tony Xie, Hong Kong (CN); Yunhe Fu, Shenzhen (CN)

(73) Assignee: SMARTECH WORLDWIDE LIMITED, Tortola (VG)

( * ) Notice: Subject to any disclaimer, the term of this patent is extended or adjusted under 35 U.S.C. 154(b) by 0 days.

(21) Appl. No.: 15/823,646

(22) Filed: Nov. 28, 2017

(65) Prior Publication Data

US 2018/0152891 A1 May 31, 2018

(30) Foreign Application Priority Data

Nov. 30, 2016 (CN) .......................... 2016 1 1086739

(51) Int. Cl.
*H04W 52/02* (2009.01)
*H04W 4/80* (2018.01)
*H04W 84/12* (2009.01)
*H04W 84/18* (2009.01)

(52) U.S. Cl.
CPC ......... *H04W 52/0235* (2013.01); *H04W 4/80* (2018.02); *H04W 84/12* (2013.01); *H04W 84/18* (2013.01); *Y02D 70/00* (2018.01); *Y02D 70/10* (2018.01); *Y02D 70/14* (2018.01); *Y02D 70/144* (2018.01); *Y02D 70/26* (2018.01)

(58) Field of Classification Search
None
See application file for complete search history.

(56) References Cited

U.S. PATENT DOCUMENTS

| 7,340,236 B2* | 3/2008 | Liang | H01Q 21/28 455/277.1 |
|---|---|---|---|
| 2006/0205401 A1* | 9/2006 | Palin | H04M 1/2535 455/425 |
| 2014/0094198 A1* | 4/2014 | Heo | H04W 52/0274 455/456.4 |
| 2015/0163748 A1 | 6/2015 | Hrabak | |

FOREIGN PATENT DOCUMENTS

| CN | 104702322 A | 6/2015 |
|---|---|---|
| GB | 2512733 A | 10/2014 |
| KR | 20150086851 A | 7/2015 |

* cited by examiner

*Primary Examiner* — Christopher M Crutchfield
*Assistant Examiner* — Thinh D Tran
(74) *Attorney, Agent, or Firm* — Na Xu; IPro, PLLC

(57) ABSTRACT

A method for switching Bluetooth working modes, an electronic device, and a Bluetooth chip are disclosed. The method includes: executing a first Bluetooth working mode, the first Bluetooth working mode including a working state in which data is normally transmitted and an error state in which data fails to be transmitted; monitoring a first interrupt request signal sent in a second Bluetooth working mode if the first Bluetooth working mode works in the working state; and executing the second Bluetooth working mode and enabling the first Bluetooth working mode to work in the error state if the first interrupt request signal is present.

14 Claims, 3 Drawing Sheets

METHOD FOR SWITCHING BLUETOOTH WORKING MODES, ELECTRONIC DEVICE, AND BLUETOOTH CHIP

CROSS-REFERENCE TO RELATED APPLICATIONS

The present disclosure claims priority to Chinese Patent Application No. 201611086739.4, filed with the Chinese Patent Office on Nov. 30, 2016, titled "METHOD AND APPARATUS FOR SWITCHING BLUETOOTH WORKING MODES, BLUETOOTH CHIP, AND ELECTRONIC DEVICE", the entire contents of which are incorporated herein by reference.

TECHNICAL FIELD

The present disclosure relates to the technical field of Bluetooth communication, and in particular, relates to a method for switching Bluetooth working modes, an electronic device, and a Bluetooth chip.

BACKGROUND

The current Bluetooth technologies include the basic rate (BR) Bluetooth technology and the Bluetooth low energy (BLE) technology. The BR Bluetooth implements enhanced data rate (EDR) Bluetooth transmission, whereas the BLE Bluetooth is a supplement to the traditional BR/EDR Bluetooth technologies. All the protocols and services in the BLE Bluetooth are based on generic attribute profile (GATT), and do not support SPP transmission protocol of the BR Bluetooth. Therefore, a single-mode Bluetooth communication module only supports one Bluetooth transmission protocol, and fails to be compatible with the BLE Bluetooth or BR Bluetooth.

For a better practicability, the dual-mode Bluetooth module-based technology is applied, which supports both the BLE Bluetooth protocol and the BR Bluetooth protocol. In communication using a dual-mode Bluetooth module, switchover is implemented between the BLE Bluetooth and the BR Bluetooth, and data transmission is carried out to the currently connected Bluetooth protocol alternatively by using a shared radio frequency module.

SUMMARY

An embodiment of the present disclosure provides a method for switching Bluetooth working modes. The method includes:

executing a first Bluetooth working mode, the first Bluetooth working mode including a working state in which data is normally transmitted and an error state in which data fails to be transmitted;

monitoring a first interrupt request signal sent in a second Bluetooth working mode if the first Bluetooth working mode works in the working state; and executing the second Bluetooth working mode and enabling the first Bluetooth working mode to work in the error state if the first interrupt request signal is present.

Another embodiment of the present disclosure provides an electronic device. The electronic device includes:

a memory; and a processor coupled to the memory, the memory storing instructions that are executable by the processor, wherein execution of the instructions by the processor causes the processor to:

execute a first Bluetooth working mode, the first Bluetooth working mode including a working state in which data is normally transmitted and an error state in which data fails to be transmitted;

monitor a first interrupt request signal sent in a second Bluetooth working mode if the first Bluetooth working mode works in the working state; and execute the second Bluetooth working mode and enabling the first Bluetooth working mode to work in the error state if the first interrupt request signal is present.

Still another embodiment of the present disclosure provides a Bluetooth chip. The Bluetooth chip includes:

a control circuit, a radio frequency module, a data transmission module, a first Bluetooth working module, and a second Bluetooth working module, the first Bluetooth working module capable of executing a first Bluetooth working mode, the first Bluetooth working mode comprising a working state in which data is normally transmitted and an error state in which data fails to be transmitted, the second Bluetooth working module capable of executing a second Bluetooth working mode;

wherein if the first Bluetooth working mode is executed, the control circuit is configured to control a data stream of the first Bluetooth working module to be sent and received via the data transmission module and the radio frequency module; and if the second Bluetooth working mode is executed, the control circuit is configured to control a data stream of the second Bluetooth working module to be sent and received via the data transmission module and the radio frequency module.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

In order to make the objectives, technical solutions, and advantages of the present disclosure clearer, the present disclosure is further described in detail below by reference to the embodiments and the accompanying drawings. It should be understood that the specific embodiments described herein are only intended to explain the present disclosure instead of limiting the present disclosure.

The Bluetooth wireless communication protocol has been revised for many times during its validity period. The latest version is entitled Bluetooth intelligent (or version 4.0), and the Bluetooth standard V4.0 includes the "classic Bluetooth" and "Bluetooth low energy (BLE)" protocols. In the embodiment, the classical Bluetooth protocol named "basic rate/enhanced data rate (BR/EDR)" has a data throughput higher than that of the BLE, for example, a 1 to 3 Mbit/s symbol rate and a 0.7 to 2.1 Mbit/s application throughput. The BLE supports up to a 1 Mbit/s symbol rate and a 305 kbit/s application throughput. However, the BLE allows the power consumption to be between 1% and 50% of the power consumption of the classical Bluetooth.

The BLE is generally implemented in a single mode or dual modes. In the single-mode BLE, the BLE protocol stack is only implemented, for example, in the Nordic semiconductor nRF8001 integrated circuit. The single-mode BLE implementation scheme is generally used in an apparatus in which power saving is the major design intention, for example, a remote sensor, an approximate mark, a health surveillance product or the like. In the dual-mode BLE implementation scheme, the BLE protocol stack is integrated into a conventional classical Bluetooth controller, such that the controller is allowed to support the classical Bluetooth or the BLE connection. The dual-mode BLE implementation scheme is generally used in an apparatus in which it is desired that the needed power does not surpass relative to the power needed by a Bluetooth chip array, and the dual mode BLE implementation scheme is used in a scenario where an apparatus having a Bluetooth chip array probably needs to communicate with the apparatus using the classical Bluetooth and the apparatus using the BLE. For example, cellular calls may need to communicate with the classical wireless headphone and a health surveillance apparatus using the BLE.

In the embodiments of the present disclosure, implementation schemes of the embodiments all involve an apparatus having the classical (BR/EDR) function and the BLE function.

Figure 1:
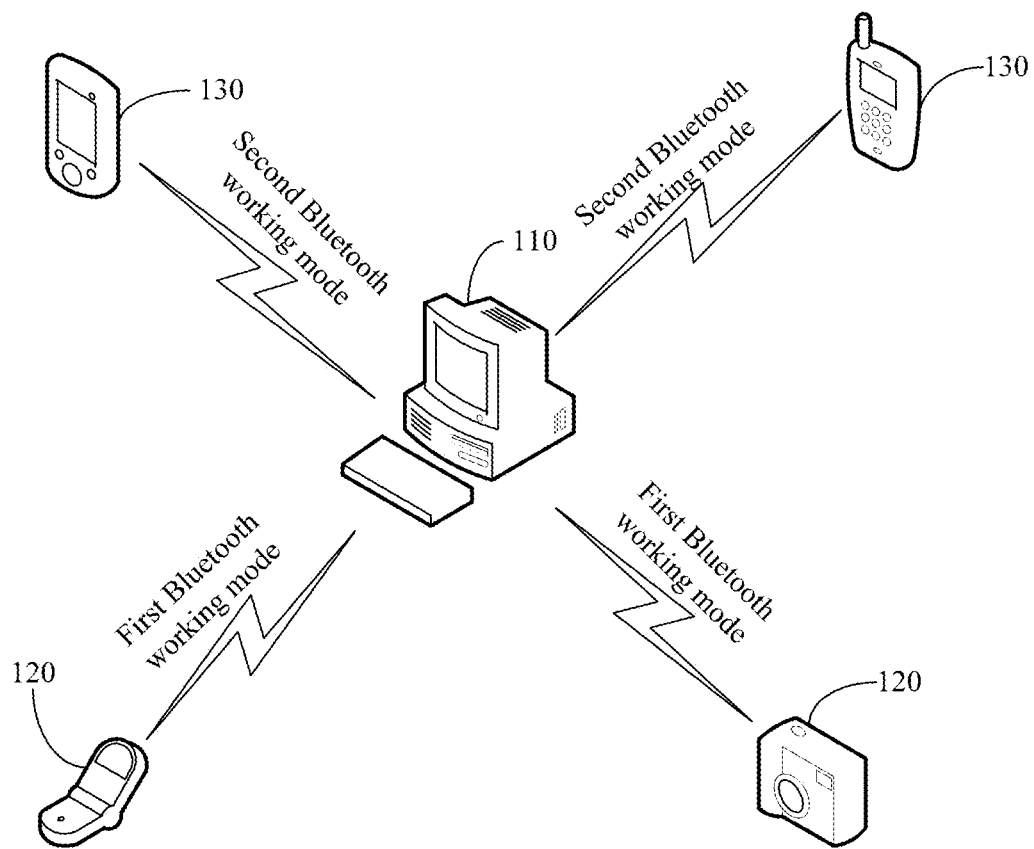
FIG. 1 is a schematic diagram of an application environment involved in various embodiments of the present disclosure.

Referring to FIG. 1, FIG. 1 is a schematic diagram of an application environment involved in various embodiments of the present disclosure. As illustrated in FIG. 1, the application environment includes: a primary device 110, a first slave device 120 and a second slave device 130.

The primary device 110 is a device which initiatively proposes communication demands, and is a terminal supporting the dual-mode protocol, which is capable of supporting the BLE Bluetooth protocol and the BR/EDR Bluetooth protocol at the same time. The primary device 110 includes a module supporting the BLE Bluetooth protocol and the BR/EDR Bluetooth protocol, wherein the module simultaneously compatibly supports an operating system including the iOS system, Android system, Microsoft system and the like.

The first and second slave devices 120, 130 are devices that are passive in communication, and the first slave device 120 may be a terminal supporting the BR/EDR Bluetooth protocol or may be a terminal supporting the dual-mode protocol. The second slave device 130 is a terminal supporting a single-mode protocol. The terminal supporting the BR/EDR Bluetooth protocol or the terminal supporting the BLE Bluetooth protocol includes: a mobile phone, a camera, a tablet computer, an earphone, a watch, a heart rate monitor, a step counter, a remote controller, a Bluetooth LED lamp and the like.

A conventional dual-mode implementation scheme attempts to connect to an apparatus by using a supported maximum data rate. Therefore, if a Bluetooth connection is established between two dual-mode apparatuses, the established Bluetooth connection is a classical Bluetooth connection; and if a Bluetooth connection is established between a dual-mode apparatus and a single-mode apparatus, the established Bluetooth connection is only based on the BLE. For example, when Bluetooth connection are established between a mobile phone using the dual-mode protocol and a wireless headphone using the dual-mode protocol, and between the mobile phone using the dual-mode protocol and a smart bracelet using the BLE protocol respectively, during data transmission, the mobile phone using the dual-mode protocol carries out data communication with the wireless headphone based on the BR/EDR protocol, and carries out data communication with the smart bracelet based on the BLE protocol. In this process, the working modes of the two protocols needs to be reasonable scheduled, to ensure the efficiency of data communication.

In the embodiments hereinafter, an apparatus which is capable of reasonably scheduling the BR/EDR working mode and the BLE working mode is disclosed.

Figure 2:
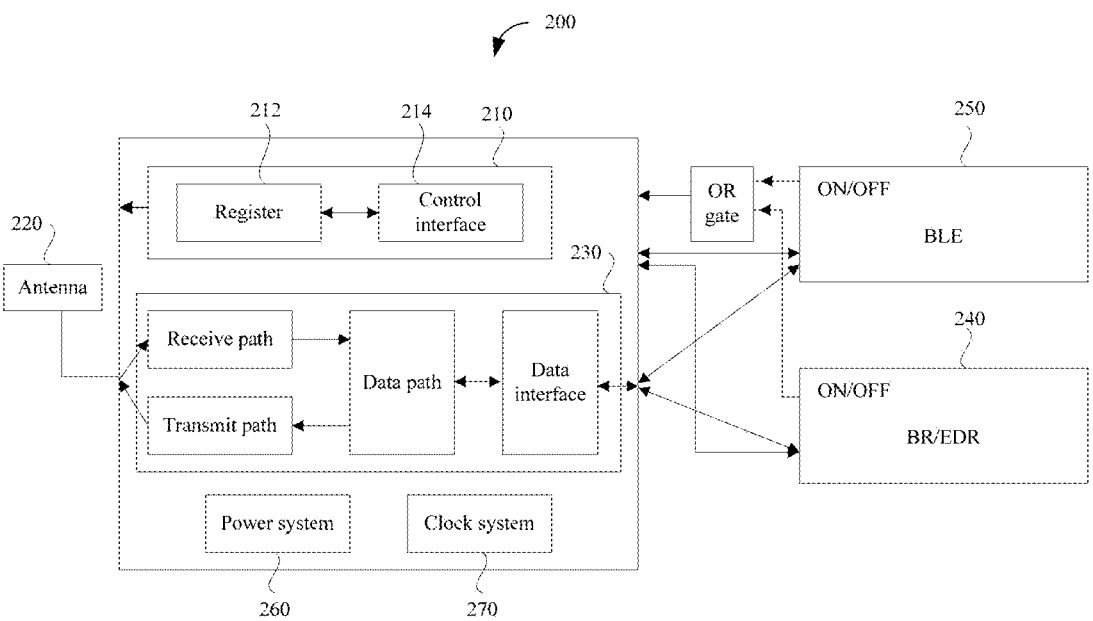
FIG. 2 is a schematic structural diagram of a Bluetooth chip according to an embodiment of the present disclosure.

Referring to FIG. 2, FIG. 2 is a schematic structural diagram of a Bluetooth chip according to an embodiment of the present disclosure. The Bluetooth chip 200 supports dual-mode Bluetooth connection, and integrates single chip arrays of the BR/EDR and BLE protocol stacks, which may be applied to the above master device and slave devices. As illustrated in FIG. 2, the Bluetooth chip 200 includes: a control circuit 210, a radio frequency module 220, a data transmission module 230, a first Bluetooth working module 240, a second Bluetooth working module 250, a power system 260, and a clock system 270.

The control circuit 210 includes a register 212 and a control interface 214. The register 212 is configure to define relevant parameters of the radio frequency module 220, for example, transmit power, receive sensitivity, transmit channel, modulation mode and the like. The control interface 214 is configure to control the register 212, and acts as a read and write interface of the register 212.

The radio frequency module 220 is configured to wireless receive and send data from other Bluetooth devices according to standard specifications. The radio frequency module 220 includes an antenna, wherein the antenna is configured to ensure reception and transmission quality of wireless signals. In the embodiment, when the Bluetooth chip works, two Bluetooth working modes share the radio frequency module. Therefore, reasonable scheduling the two Bluetooth working modes is also to reasonably allocating the resources of the radio frequency module.

The data transmission module 230 includes a receive path, a transmit path, a data path and a data interface, wherein the data interface acts as a read and write interface of the data transmission module 230. During data writing, data streams pass through the receive path and the data path to the data interface, and then are transmitted to the Bluetooth working module; and during data reading, data streams pass through the data interface, the data path to the transmit path, and then are transmitted to the radio frequency module 220.

The first Bluetooth working module 240 is a module using a first Bluetooth working mode, wherein the first Bluetooth working mode is the BR/EDR mode. The second Bluetooth working module 250 is a module using a second Bluetooth working mode, wherein the second Bluetooth working mode is the BLE mode.

The power system 260 is configured to supply power to the Bluetooth chip 200, and the power system 260 may be a power source which directly supplies power to the Bluetooth chip 200, or may be a voltage converter interface which converts a current from the battery of a device using the Bluetooth chip 200 into a current that is suitable to the Bluetooth chip 200.

The clock system 270 may also be referred to as a local clock, and each Bluetooth device has an independently running internal clock system, which determines receive and transmit frequency-hopping of a timer. For synchronization with other Bluetooth devices, the clock system generally needs an offset, which is provided to other Bluetooth devices for synchronization. A Bluetooth device implements Real-time voice, exchanges data information streams and establishes an instant network with other Bluetooth devices based on a Bluetooth baseband. In the clock system, the Bluetooth baseband includes four key cycles, respectively, 312.5 µs, 625 µs, 1.25 ms, and 1.28 s.

In the embodiment, the control circuit 210 is respectively connected to the radio frequency module 220, the data transmitting module 230, the first Bluetooth working module 240, the second Bluetooth working module 250, the power supply system 260 and the clock system 270. The first Bluetooth working module 240 and the second Bluetooth working module 250 are connected to the control circuit 210 via an OR gate logic circuit. The OR gate logic circuit includes a first OR gate input terminal, a second OR gate input terminal and an OR gate output terminal. Specifically, the first OR gate input terminal is connected to the first Bluetooth working module 240, and configured to receive a first data signal sent by the first Bluetooth working module 240. The second OR gate input terminal is connected to the second Bluetooth working module 250, and configured to receive a second data signal sent by the second Bluetooth working module 250. The OR gate output terminal is connected to the control circuit 210, and the control circuit 210 performs corresponding control according to a logic relationship of data signal at the OR gate output terminal, and mainly controls a working sequence of these two Bluetooth working modules.

In the embodiment, when the first Bluetooth working mode (i.e. the BR/EDR mode) is executed, the control circuit 210 controls a data stream of the first Bluetooth working module 240 to be sent and received via the data transmitting module 230 and the radio frequency module 220, wherein the data stream of the first Bluetooth working module 240 includes sent data and received data. When the data is sent, the data enters from the data interface into the data path, from the data path to the transmit path then to the radio frequency module 220; and when the data is received, the data enters from the radio frequency module 220 to the receive path, from the receive path to the data path then to the data interface, and enters the first Bluetooth working module 240 via the data interface.

In the embodiment, when the second Bluetooth working mode (i.e. the BLE mode) is executed, the control circuit 210 controls a data stream of the second Bluetooth working module 250 to be sent and received via the data transmitting module 230 and the radio frequency module 220, wherein the data stream of the second Bluetooth working module 250 includes sent data and received data. When the data is sent, the data enters from the data interface into the data path, from the data path to the transmit path then to the radio frequency module 220; and when the data is received, the data enters from the radio frequency module 220 to the receive path, from the receive path to the data path then to the data interface, and enters the second Bluetooth working module 250 via the data interface.

In the embodiment, the first Bluetooth working mode includes a working state in which data is normally transmitted and an error state in which data fails to be transmitted. When the first Bluetooth working mode is executed, in the working state in which data is normally transmitted, the first Bluetooth working module 240 is further configured to monitor the second Bluetooth working module 250, and mainly monitor whether an interrupt request signal is sent. If the interrupt request signal is received, the control circuit 210 controls the second Bluetooth working module 250 to execute the second Bluetooth working mode. In the meantime, the first Bluetooth working module 240 is enabled to maintain an original state machine to continuously execute the first Bluetooth working mode. However, this working mode is in the error state in which data fails to be transmitted, and during this process, a data packet transferred by the first Bluetooth working module 240 is discarded. If the interrupt request signal is received again, the control circuit 210 controls the first Bluetooth working module 240 to execute the first Bluetooth working mode, and enables the first Bluetooth working mode to work in the working state.

During a switching process in these two working modes, the BR/EDR mode is in the working state all the time, and will be immediately switched to the BLE working mode when the BLE communication is needed. After the BLE communication is completed, the interrupt request signal is initiatively sent to the control circuit 210, and thus the BLE mode is switched back to the BR/EDR mode. The time for the BLE communication may be predetermined according to communication time sequences of the device including the Bluetooth chip and other devices in the BLE communication, that is, the time of the BLE communication request may be predetermined. For example, the time of a communication request is defined to 100 ms, after 100 ms, the second Bluetooth working module 250 initiatively sends an interrupt request signal to the control circuit 210, and the control circuit 210 switches the current BR/EDR mode to the BLE mode according to the interrupt request signal. As such, in the BLE working mode, all communication events may be finished in 1 to 2 milliseconds, which only equals to three interrupts of 625 µs. Therefore, the communication of the BR/EDR will not be affected, and the priority of the BLE mode is ensured with no need of adjusting the time sequence of the BR/BLD mode. In this case, the cost of adjusting the time is lowered, and the switching efficiency is improved.

The embodiment of the present disclosure provides a Bluetooth chip 200, wherein the Bluetooth chip 200 controls the communication of the first Bluetooth working module 240 and the second Bluetooth working module 250 via the control circuit 210. Therefore, the Bluetooth chip 200 is capable of supporting communication of the BR/EDR device and the BLE device simultaneously, satisfying an actual application scenario, and ensuring the priority of the BLE communication. In this way, the time duration in which the BR/EDR bandwidth is occupied is shortened, and the communication efficiency of the dual-mode Bluetooth chip is entirely improved.

An embodiment of the present disclosure further provides an electronic device, wherein the electronic device includes the Bluetooth chip 200 described in the above embodiments, such that the electronic device supports dual-mode Bluetooth communication.

The electronic device in the embodiments of the present disclosure is practiced in various forms, including, but not limited to:

(1) a mobile communication device: which has the mobile communication function and is intended to provide mainly voice and data communications; wherein such terminals include: a smart phone (for example, an iPhone), a multi-media mobile phone, a functional mobile phone and the like;

(2) an ultra mobile personal computer device: which pertains to the category of personal computers and has the computing and processing functions, and additionally has the mobile Internet access feature; wherein such terminals include: a PDA, an MID, an UMPC device and the like, for example, an iPad;

(3) a portable entertainment device: which displays and plays multimedia content; wherein such devices include: an audio or video player (for example, an iPod), a palm game machine, an electronic book, and a smart toy, and a portable vehicle-mounted navigation device;

(4) other electronic devices having the data interaction function.

Figure 3:
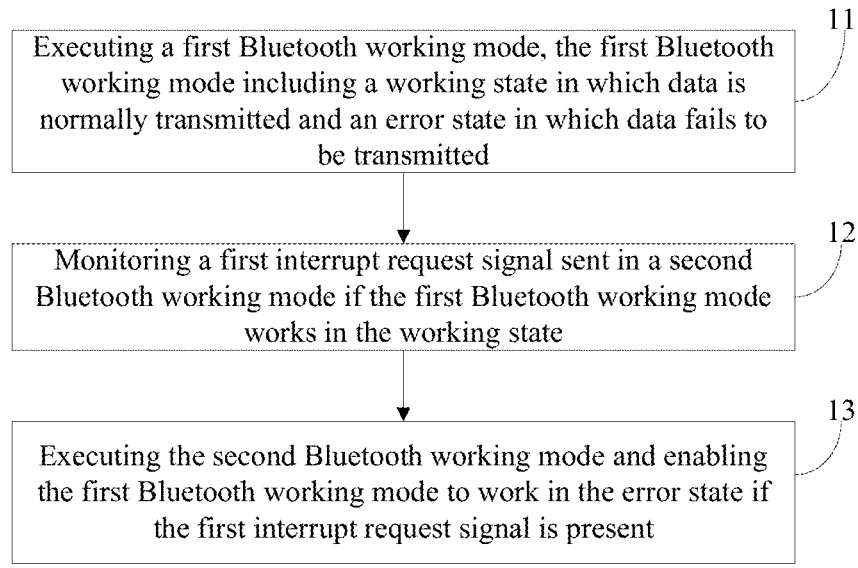
FIG. 3 is a schematic flowchart of a method for switching Bluetooth working modes according to an embodiment of the present disclosure.

Referring to FIG. 3, FIG. 3 is a schematic flowchart of a method for switching Bluetooth working modes according to an embodiment of the present disclosure, wherein the method may be applied to a Bluetooth chip 200 in the above embodiments. As illustrated in FIG. 3, the method includes the following steps:

Step 11: A first Bluetooth working mode is executed, wherein the first Bluetooth working mode includes a working state in which data is normally transmitted and an error state in which data fails to be transmitted.

Step 12: A first interrupt request signal sent in a second Bluetooth working mode is monitored if the first Bluetooth working mode works in the working state.

Step 13: The second Bluetooth working mode is executed and the first Bluetooth working mode is enabled to work in the error state if the first interrupt request signal is present.

The first Bluetooth working mode is a BR/EDR mode, and the execution of the BR/EDR mode is to carry out communication between a device executing the method and a Bluetooth device using the BR/EDR mode. During this process, the working state in which data is normally transmitted and the error state in which data fails to be transmitted are included. The second Bluetooth working mode is a BLE mode, and the execution of the BLE mode is to carry out communication between the device executing the method and a Bluetooth device using the BLE mode. The Bluetooth device using the BR/EDR mode includes a device supporting dual-mode Bluetooth, and a Bluetooth device only supporting the BR/EDR communication. The Bluetooth device using the BLE mode includes a Bluetooth device supporting a BLE single mode.

If the first Bluetooth working mode works in the working state, that is, the BR/EDR mode is executed and in the working state in which data is normally transmitted, in this case, the second Bluetooth working mode is monitored, such that the first Bluetooth working mode continuously maintains the working state after the first interrupt request signal is acquired. However, a transferred data packet is discarded, which causes the first Bluetooth working mode to enter the error state in which data fails to be transmitted. In the meantime, the second Bluetooth working mode is executed, that is, the BR/EDR mode is switched to the BLE mode. The first interrupt request signal is a signal initiatively sent in the BLE mode. The time for sending the first interrupt request signal in the BLE mode may be predetermined, and may be defined according to communication time sequences of the device executing the method and other devices using the BLE communication. The first interrupt request signal is the signal sent by the BLE to a controller. The controller may be the control circuit described in the above embodiments or may be a CPU. The controller switches a current BR/EDR working mode to the BLE working mode upon receiving the first interrupt request signal. In the BLE working mode, all communication events may be finished in 1 to 2 milliseconds, which only equals to three interrupts of 625 µs. Therefore, the communication of the BR/EDR will not be affected, and when being switched back, the BR/EDR mode is capable of still maintaining an original state to continuously work.

In the embodiment, the priority of the BLE is ensured, that is, when the BLE communication request is present, the current state is immediately switched to the BLE working mode, and the priority of the BLE mode is ensured with no need of adjusting the time sequence of the BR/BLD mode.

An embodiment of the present disclosure provides a method for switching Bluetooth working modes. In the method, the second Bluetooth working mode is monitored when the first Bluetooth working mode is executed, and the first Bluetooth working mode is switched to the second Bluetooth working mode when the interrupt request signal sent by the second Bluetooth working mode is received. In this case, the first Bluetooth working mode is still in the working state. When two Bluetooth working modes are executed according to this technical scheme, the priority of one mode is always achieved, and working clearance and communication cycle of the other mode do not need to be adjusted. In this way, the time for adjustment is decreased, and the efficiency of mode switching is improved.

Figure 4:
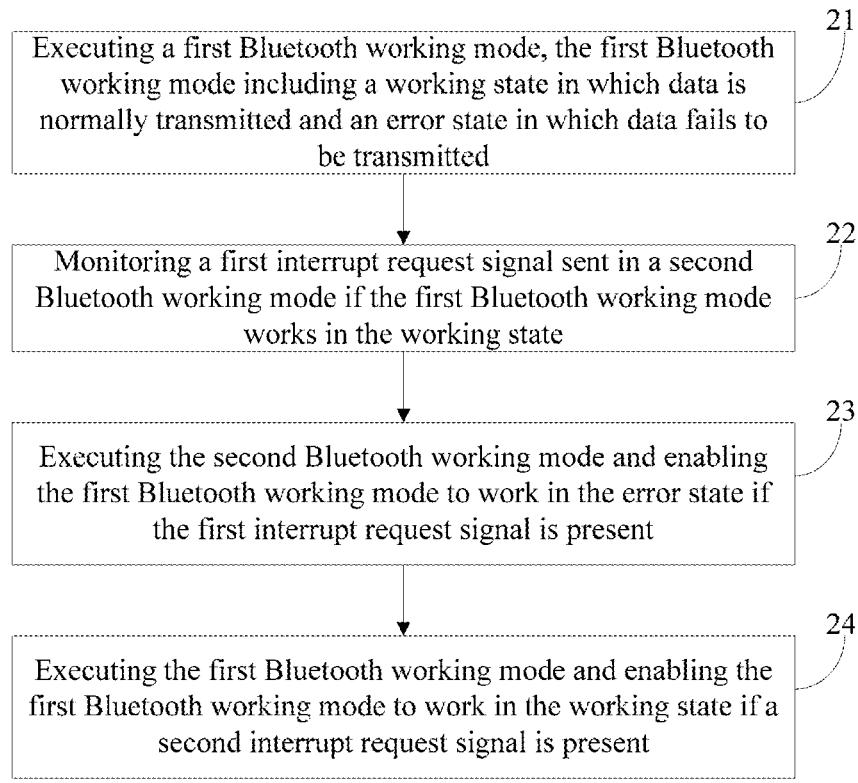
FIG. 4 is a schematic flowchart of a method for switching Bluetooth working modes according to another embodiment of the present disclosure.

Referring to FIG. 4, FIG. 4 is a schematic flowchart of a method for switching Bluetooth working modes according to another embodiment of the present disclosure, the method includes the following steps.

Step 21: A first Bluetooth working mode is executed, wherein the first Bluetooth working mode includes a working state in which data is normally transmitted and an error state in which data fails to be transmitted.

Step 22: A first interrupt request signal sent in a second Bluetooth working mode is monitored if the first Bluetooth working mode works in the working state.

Step 23: The second Bluetooth working mode is executed and the first Bluetooth working mode is enabled to work in the error state if the first interrupt request signal is present.

Steps 21 to 23 may be referenced to the description in the above method embodiments, which are not detailed herein any further.

Step 24: The first Bluetooth working mode is executed and the first Bluetooth working mode is enabled to work in the working state if a second interrupt request signal is present.

The second interrupt request signal is the interrupt request signal initiatively sent, by the BLE executing the second Bluetooth working mode upon finishing a communication task, to the controller. Upon receiving the second interrupt request signal, the controller executes a BR/EDR working mode, and enables a current working mode to the working state in which data is normally transmitted. The normal transmission data includes sent data and received data.

It should be noted that the BR/EDR mode in a normal working state will continuously monitor the second Bluetooth working mode to ensure the priority of the BLE working mode.

An embodiment of the present disclosure provides a method for switching Bluetooth working modes. In the method, the second Bluetooth working mode is monitored when the first Bluetooth working mode is executed and the first Bluetooth working mode is switched to the second Bluetooth working mode when the interrupt request signal sent by the second Bluetooth working mode is received. In this case, the first Bluetooth working mode is still in the working state in which data fails to be transmitted, and the first Bluetooth working mode is switched back when the interrupt request signal sent by the second Bluetooth working mode is received again. In this technical scheme, reasonable switching in two Bluetooth working modes is implemented, reasonable allocation of radio frequency resources is ensured, and data transmission efficiency is improved.

Figure 5:
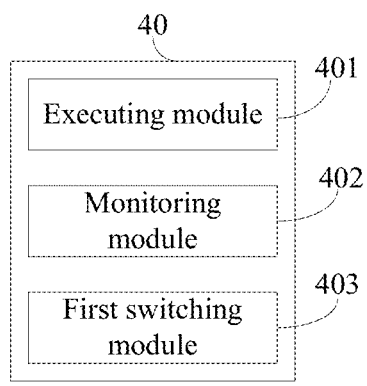
FIG. 5 is a schematic structural diagram of an apparatus for switching Bluetooth working modes according to an embodiment of the present disclosure.

Referring to FIG. 5, FIG. 5 is a schematic structural diagram of an apparatus for switching Bluetooth working modes according to an embodiment of the present disclosure, wherein the apparatus 40 includes an executing module 401, a monitoring module 402 and a first switching module 403.

The executing module 401 is configured to execute a first Bluetooth working mode, wherein the first Bluetooth working mode includes a working state in which data is normally transmitted and an error state in which data fails to be transmitted; the monitoring module 402 is configured to monitor a first interrupt request signal sent in a second Bluetooth working mode if the first Bluetooth working mode works in the working state; and the first switching module 403 is configured to execute the second Bluetooth working mode and enable the first Bluetooth working mode to work in the error state if the first interrupt request signal is present.

The first Bluetooth working mode is a BR/EDR mode.

The first interrupt request signal is an interrupt request signal sent when a predetermined communication time is reached, the communication time being defined according to a communication time sequence of a device corresponding to the second Bluetooth working mode.

The enabling the first Bluetooth working mode to work in the error state includes: maintaining an original state machine to continuously work in the first Bluetooth working mode, and discarding a transferred data packet.

It should be noted that: since the contents such as information interaction between modules in the apparatus and execution processes are based on the same inventive concept as method embodiments of the present disclosure, the specific content may refer to the description of the method embodiments of the present disclosure, which is not defined herein any further.

An embodiment of the present disclosure provides an apparatus for switching Bluetooth working modes. In the apparatus, the second Bluetooth working mode is monitored when the first Bluetooth working mode is executed and the first Bluetooth working mode is switched to the second Bluetooth working mode when the interrupt request signal sent by the second Bluetooth working mode is received. In this case, the first Bluetooth working mode is still in the working state. When two Bluetooth working modes are executed according to this technical scheme, the priority of one mode is always achieved, and working clearance and communication cycle of the other mode do not need to be adjusted. In this way, the time for adjustment is decreased, and the efficiency of mode switching is improved.

Figure 6:
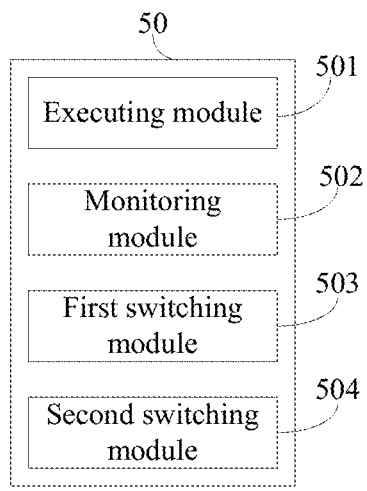
FIG. 6 is a schematic structural diagram of an apparatus for switching Bluetooth working modes according to another embodiment of the present disclosure.

Referring to FIG. 6, FIG. 6 is a schematic structural diagram of an apparatus for switching Bluetooth working modes according to another embodiment of the present disclosure, wherein the apparatus 50 includes an executing module 501, a monitoring module 502, a first switching module 503 and a second switching module 504.

The executing module 501 is configured to execute a first Bluetooth working mode, wherein the first Bluetooth working mode includes a working state in which data is normally transmitted and an error state in which data fails to be transmitted; the monitoring module 502 is configured to monitor a first interrupt request signal sent in a second Bluetooth working mode if the first Bluetooth working mode works in the working state; the first switching module 503 is configured to execute the second Bluetooth working mode and enable the first Bluetooth working mode to work in the error state if the first interrupt request signal is present, and the second witching module 504 is configured to execute the first Bluetooth working mode and enable the first Bluetooth working mode to work in the working state if a second interrupt request signal is present.

The first Bluetooth working mode is a BR/EDR mode.

The first interrupt request signal is an interrupt request signal sent when a predetermined communication time is reached, the communication time being defined according to a communication time sequence of a device corresponding to the second Bluetooth working mode.

The enabling the first Bluetooth working mode to work in the error state includes: maintaining an original state machine to continuously work in the first Bluetooth working mode, and discarding a transferred data packet.

It should be noted that: since the contents such as information interaction between modules in the apparatus and execution processes are based on the same inventive concept as method embodiments of the present disclosure, the specific content may refer to the description of the method embodiments of the present disclosure, which is not defined herein any further.

An embodiment of the present disclosure provides an apparatus for switching Bluetooth working modes. In the apparatus, the second Bluetooth working mode is monitored when the first Bluetooth working mode is executed and the first Bluetooth working mode is switched to the second Bluetooth working mode when the interrupt request signal sent by the second Bluetooth working mode is received. In this case, the first Bluetooth working mode is still in the working state in which data fails to be transmitted, and the first Bluetooth working mode is switched back when the interrupt request signal sent by the second Bluetooth working mode is received again. In this technical scheme, reasonable switching in two Bluetooth working modes is implemented, reasonable allocation of radio frequency resources is ensured, and data transmission efficiency is improved.

Figure 7:
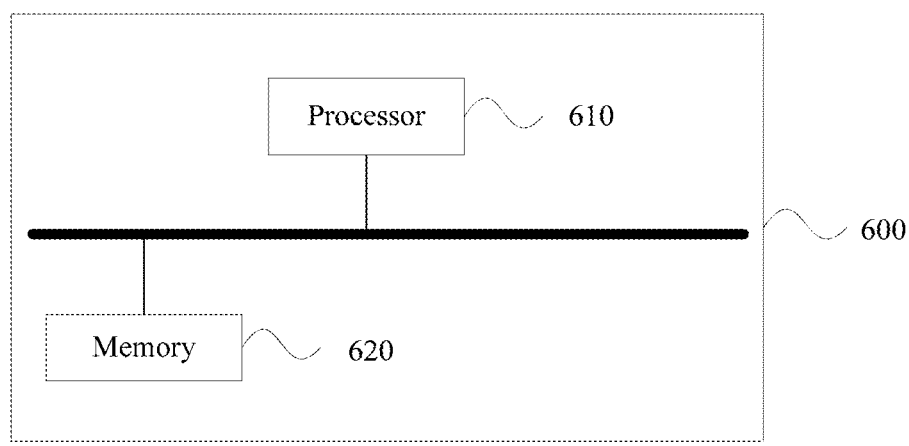
FIG. 7 is a schematic structural diagram of an electronic device according to an embodiment of the present disclosure.

An embodiment of the present disclosure further provides an electronic device. FIG. 7 is a schematic structural diagram of an electronic device according to an embodiment of the present disclosure. The electronic device 600 includes: a memory 620, and a processor 610 coupled to the memory 620.

The memory 620 stores instructions that are executable by the processor 610, and the processor 610 executes the instructions to cause the processor 610 to perform the steps in the above method embodiment: for example, executing a first Bluetooth working mode, the first Bluetooth working mode including a working state in which data is normally transmitted and an error state in which data fails to be transmitted; monitoring a first interrupt request signal sent in a second Bluetooth working mode if the first Bluetooth working mode works in the working state; and executing the second Bluetooth working mode and enabling the first Bluetooth working mode to work in the error state if the first interrupt request signal is present.

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A method for switching Bluetooth working modes, comprising:
   executing a first Bluetooth working mode, the first Bluetooth working mode comprising a working state in which data is normally transmitted and an error state in which an original state machine is maintained to continuously work in the first Bluetooth working mode and a transferred data packet is discarded;
   monitoring a first interrupt request signal sent in a second Bluetooth working mode if the first Bluetooth working mode works in the working state; and
   executing the second Bluetooth working mode and enabling the first Bluetooth working mode to work in the error state if the first interrupt request signal is present.

2. The method according to claim 1, wherein the first Bluetooth working mode is a BR/EDR mode.

3. The method according to claim 1, wherein the first interrupt request signal is an interrupt request signal sent when a predetermined communication time is reached, the communication time being defined according to a communication time sequence of a device corresponding to the second Bluetooth working mode.

4. The method according to claim 1, further comprising:
   executing the first Bluetooth working mode and enabling the first Bluetooth working mode to work in the working state if a second interrupt request signal is present.

5. An electronic device, comprising:
   a memory; and
   a processor coupled to the memory, the memory storing instructions that are executable by the processor, wherein execution of the instructions by the processor causes the processor to:
   execute a first Bluetooth working mode, the first Bluetooth working mode comprising a working state in which data is normally transmitted and an error state in which an original state machine is maintained to continuously work in the first Bluetooth working mode and a transferred data packet is discarded;
   monitor a first interrupt request signal sent in a second Bluetooth working mode if the first Bluetooth working mode works in the working state; and
   execute the second Bluetooth working mode and enabling the first Bluetooth working mode to work in the error state if the first interrupt request signal is present.

6. The electronic device according to claim 5, wherein the first Bluetooth working mode is a BR/EDR mode.

7. The electronic device according to claim 5, wherein the first interrupt request signal is an interrupt request signal sent when a predetermined communication time is reached, the communication time being defined according to a communication time sequence of a device corresponding to the second Bluetooth working mode.

8. The electronic device according to claim 5, wherein execution of the instructions by the processor further causes the processor to:
   execute the first Bluetooth working mode and enable the first Bluetooth working mode to work in the working state if a second interrupt request signal is present.

9. A Bluetooth chip, comprising:
   a control circuit, a radio frequency module, a data transmission module, a first Bluetooth working module, and a second Bluetooth working module, the first Bluetooth working module capable of executing a first Bluetooth working mode, the first Bluetooth working mode comprising a working state in which data is normally transmitted and an error state in which an original state machine is maintained to continuously work in the first Bluetooth working mode and a transferred data packet is discarded, the second Bluetooth working module capable of executing a second Bluetooth working mode;
   wherein if the first Bluetooth working mode is executed, the control circuit is configured to control a data stream of the first Bluetooth working module to be sent and received via the data transmission module and the radio frequency module; and if the second Bluetooth working mode is executed, the control circuit is configured to control a data stream of the second Bluetooth working module to be sent and received via the data transmission module and the radio frequency module.

10. The Bluetooth chip according to claim 9, wherein the control circuit comprises a register and a control interface, wherein the control interface is configured to control read and write of the register, and the register is configured to configure a parameter of the radio frequency module.

11. The Bluetooth chip according to claim 9, wherein the first Bluetooth working mode is a BR/EDR mode.

12. The Bluetooth chip according to claim 9, wherein the first Bluetooth working module is configured to execute the first Bluetooth working mode.

13. The Bluetooth chip according to claim 12, wherein if the first Bluetooth working mode works in the working state, the first Bluetooth working module is configured to monitor a first interrupt request signal sent by the second Bluetooth working module; and if the first interrupt request signal is present, the control circuit is configured to control the second Bluetooth working module to execute the second Bluetooth working mode, and enable the first Bluetooth working mode to work in the error state.

14. The Bluetooth chip according to claim 9, wherein if a second interrupt request signal is present, the control circuit is configured to control the first Bluetooth working module to execute the first Bluetooth working mode, and enable the first Bluetooth working mode to work in the working state.

* * * * *